United States Patent [19]

Cohen

[11] Patent Number: 4,537,798
[45] Date of Patent: Aug. 27, 1985

[54] SEMI-REFLECTIVE GLAZING COMPRISING A NICKEL-CHROMIUM-MOLYBDENUM ALLOY ANCHORING LAYER

[75] Inventor: Sabatino Cohen, Sceaux, France

[73] Assignee: Saint-Gobain Vitrage, Courbevoie, France

[21] Appl. No.: 518,913

[22] Filed: Aug. 1, 1983

Related U.S. Application Data

[63] Continuation of Ser. No. 267,528, May 27, 1981, abandoned.

[30] Foreign Application Priority Data

Jun. 4, 1980 [FR] France .................................. 80 12449

[51] Int. Cl.$^3$ ........................................ B05D 5/06
[52] U.S. Cl. ........................................ 427/166; 156/99; 156/106; 427/167; 427/250; 427/255; 427/255.7; 427/404; 427/419.2; 427/419.7
[58] Field of Search ............... 427/108, 109, 124, 125, 427/126.2, 164, 165, 166, 167, 250, 255, 255.7, 419.1, 419.2, 419.7, 404, 376.6, 376.2, 383.5, 294, 407.2; 428/432, 433; 75/171; 156/99, 106

[56] References Cited

U.S. PATENT DOCUMENTS

| | | | |
|---|---|---|---|
| 1,836,317 | 12/1931 | Franks | 75/170 |
| 3,062,685 | 11/1962 | Sanford et al. | 428/433 |
| 3,069,301 | 12/1962 | Buckley et al. | 156/99 |
| 3,523,847 | 8/1970 | Edwards | 156/106 |
| 3,687,713 | 8/1972 | Adams | 427/166 |
| 3,694,337 | 9/1972 | Kushihashi et al. | 428/433 |
| 3,781,077 | 12/1973 | Groth | 350/166 |
| 3,826,728 | 7/1974 | Chambers et al. | 204/192 |
| 4,022,947 | 5/1977 | Grubb et al. | 428/432 |

FOREIGN PATENT DOCUMENTS

| | | |
|---|---|---|
| 2037986 | 12/1970 | France . |
| 1524393 | 6/1975 | United Kingdom . |
| 1406940 | 9/1975 | United Kingdom . |

Primary Examiner—Sadie L. Childs
Attorney, Agent, or Firm—Pennie & Edmonds

[57] ABSTRACT

A process for making semi-reflective metallized glasses containing an anchoring layer, said anchoring layer being deposited by vacuum evaporation from an alloy comprising nickel in an amount of from about 40-70% by weight, chromium in an amount of from about 5-31% by weight, and molybdenum in an amount of from about 3-28% by weight. The anchoring layer may also be deposited from an alloy of nickel, chromium, molybdenum and at least one metal selected from the group of tungsten, iron and cobalt, in an amount of from about 55-75% by weight nickel, iron and cobalt, from about 5-31% by weight chromium, and from about 3-28% by weight molybdenum and tungsten. The anchoring layer is deposited upon the surface of a support glass by vacuum evaporation after which one or more layers may be deposited upon this anchoring layer.

26 Claims, 4 Drawing Figures

SEMI-REFLECTIVE GLAZING COMPRISING A NICKEL-CHROMIUM-MOLYBDENUM ALLOY ANCHORING LAYER This is a continuation of application Ser. No. 267,528, filed May 27, 1981, now abandoned.

BACKGROUND OF THE INVENTION

1. Field of the Invention

The present invention relates to simple or multiple semi-reflective metallized glass sheets and their process of manufacture by means of vacuum evaporation, comprising an improved alloy anchoring layer.

2. Prior Art

It is known that the term semi-reflective glasses or glazings refers to glass (or other transparent material) sheets comprising a coating upon the glass surface of one or more layers of a metal, a metallic alloy or a metal compound of sufficient thinness so as to at least partially transmit visible light and at the same time to be of such a nature that it also reflects the major portion of infrared radiation that is incident upon it. These glazings have the advantage that in the summer they are transparent to visible radiation of sun rays while reflecting the incoming infrared radiation and in the winter they reflect back the outward transmission of radiation coming from within the building.

While a great many types of semi-reflective glazings have been proposed in the past, those most widely used today are glasses which generally comprise three superimposed elemental layers, namely (1) an anchoring layer that is in contact with the surface of the glass and whose main function is to provide an excellent adherence and a good support structure for the layers that are superimposed upon it; (2) an intermediate layer or semi-reflective layer whose function is to impart to the glass the main desired optical characteristics; and (3) a protective surface layer or dielectric layer whose main function is to permit one to adjust to the desired values the extent of the transmission of the visible spectrum and the extent of the reflection of the infrared radiation. For example, the anchoring layer may consist of nickel and chromium; the intermediate layer is usually comprised of gold, silver or copper; and the protective surface layer is generally comprised of a dielectric material such as silicon oxide SiO, zinc sulfide or a mixed indium and tin oxide. It is also possible to interpose a dielectric layer beneath the reflective layer.

Nickel-chromium anchoring layers are generally deposited by means of vacuum evaporation from evaporation crucibles which are themselves constructed of a very refractory metal such as, for instances, tungsten. It has been observed that the process of vacuum evaporation of said component alloy materials for such an anchoring layer, which must be performed at a temperature of about 1500° C., causes the evaporation crucibles to be severely corroded, and frequently to be broken, thus giving inadmissible irregularities of the layer and of its properties. It is thus apparent that the use of these prior art processes on an industrial scale for the manufacture of large-sized semi-reflective glasses leads to an inordinately high cost.

This invention is directed to such multi-layered semi-reflective glasses as discussed above. More particularly, the present invention is directed to semi-reflective glasses and their process of manufacture comprising an improved alloy anchoring layer exhibiting great advantages in comparison with the semi-reflective glasses and processes of the prior art.

SUMMARY OF THE INVENTION

The present invention overcomes the drawbacks that are noted above concerning the corrosion of the evaporation crucibles by providing alloy materials for making the anchoring layers of semi-reflective coatings. The use of applicant's alloy materials has been found to cause little or no corrosion of the evaporation crucibles and to also at the same time yield an anchoring layer having excellent properties contributing to superior semi-reflective glasses. Applicant's alloy materials can also be evaporated in much larger amounts and at a faster rate than has heretofore been possible with the conventional materials of anchoring layers, and without causing the failure of the evaporation crucibles.

Applicant has discovered that all of the objects of this invention may be realized by a process for making a semi-reflective metallized glass containing an anchoring layer, said anchoring layer being deposited by means of vacuum evaporation from an alloy computing nickel in an amount of from about 40–70% by weight, chromium in an amount of from about 5–31% by weight, and molybdenum in an amount of from about 3–28% by weight. The anchoring layer may also be deposited from an alloy of nickel, chromium, molybdenum and at least one metal selected from the group of tungsten, iron and cobalt, in an amount of from about 55–75% by weight of nickel, iron and cobalt, from about 5–31% by weight of chromium, and from about 3–28% by weight of molybdenum and tungsten.

DETAILED DESCRIPTION OF THE INVENTION

Figure 1:
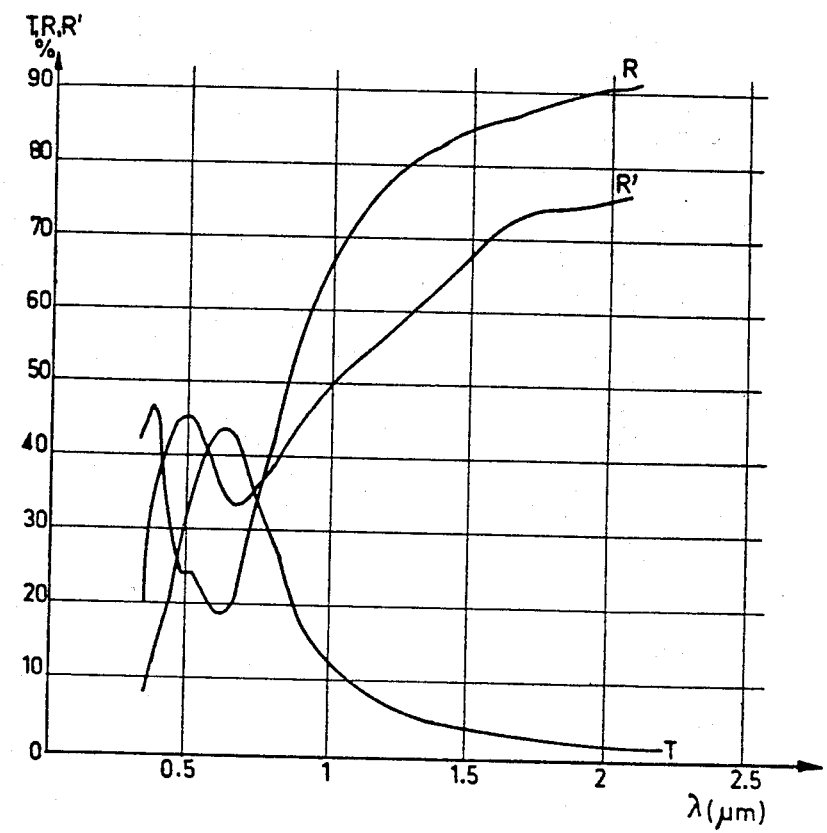
FIGS. 1–4 represent the percentage of transmission on the coated side (T), the percentage of reflection on the coated side (R) and the percentage of reflection on the uncoated side of the glass (R'), as a function of wavelength, for the glasses described, respectively, in Examples 1–4.

This invention is directed to a process for making semi-reflective metallized glasses containing an anchoring layer, said anchoring layer being deposited by vacuum evaporation from an alloy comprising nickel in an amount of from about 40–70% by weight, chromium in an amount of from about 5–31% by weight, and molybdenum in an amount of from about 3–28% by weight. The anchoring layer may also be deposited from an alloy comprising nickel, chromium, molybdenum and at least one metal selected from the group of tungsten, iron and cobalt, in an amount of from about 55–75% by weight nickel, iron and cobalt, from about 5–31% by weight chromium, and from about 3–28% by weight molybdenum and tungsten, The anchoring layer is deposited upon the surface of a support glass by vacuum evaporation after which one or more other elemental layers may be deposited upon this anchoring layer.

Preferably, the anchoring layer according to this invention may be deposited from an alloy comprising from about 40–63% by weight nickel, from about 2–20% by weight iron and wherein the total of nickel, iron and cobalt is from about 58–68% by weight, from about 15–25% by weight chromium, and from about 5–18% by weight molybdenum, from about 0–6% by weight tungsten and wherein the total of molybdenum and tungsten is from about 5–22% by weight.

More preferably yet, it has been found that the alloy to make the anchoring layer of this invention may comprise from about 15.5–17.5% by weight chromium, from about 16–18% by weight molybdenum, from about 3.7–5.3% by weight tungsten, below about 0.12% by weight carbon, from about 0.2–0.4% by weight vanadium, below about 2.5% by weight cobalt, from about 4.5–7% by weight iron and the balance of said alloy consisting essentially of nickel.

It has also been found that it is further advantageous to limit the amount of iron present in the alloy to less than about one-third by weight based upon the total amount of nickel, iron and cobalt present in said alloy. An anchoring layer of exceptionally good durability is obtained thereby.

In practice, commercially available nickel-chrome-molybdenum alloys are entirely suitable for use in the instant invention; the only limitation being of course the requirement that relative amounts of the three metals is as required herein. Some tradenamed Hastelloy alloys are typical of such well known and commercially available alloys. An example of suitably commercially available Ni-Cr-Mo alloys are those that contain 6.5% Mo (Nb+Ta on the order of about 2.1%), 9% Mo and especially those that contain 17% Mo and 4% W. The presence of additional metals within the alloy is contemplated herein provided that such additional metals do not adversely affect the quality of the resulting anchoring layer or adversely affect the substantial non-corrosion of the evaporation crucibles.

The resulting anchoring layers according to the present invention is particularly well suited for making semi-reflective glasses with a selective transmission spectrum. Such glasses comprise, in addition to the anchoring layer, other elemental layers including a further semi-reflective layer of, for instance, gold, silver or copper, and a yet further dielectric layer such as, for instance, silicon dioxide, zinc sulfide or a mixed indium and tin oxide.

Applicant has also discovered that advantageous results are obtained when an additional layer deposited from an alloy according to the present invention is used as surface layer or as underlayer for the last surface layer.

The anchoring layer deposited from an alloy used within the context of the present invention has the capability of adhering very well to a glass substrate, at least to the same degree as those obtained from known materials used in the prior art for this application. It is thus also possible according to this invention to make excellent and superior laminated glasses comprising, for instance, a polyvinylbutyral lamina layer interposed between a sheet of glass and a semi-reflective glass made according to this invention. Thus, the polyvinylbutyral lamina layer being in contact with the outside layer of the semi-reflective coatings, the alloy of this invention can be utilized, in effect, as anchoring layer and as bonding medium. The process of producing such laminated glasses and the resulting laminated glasses are thus intended to come within the scope of this invention.

The process of depositing anchoring layers according to this invention can be carried out with the usual and known techniques of vacuum evaporation. Thus, preferably, the glass surface is first superficially cleaned with a suspension of cerium oxide in water and alcohol. The glass sheet on which the deposit is to be performed is then installed in a vacuum enclosure in which the evaporation is performed and in which a low vacuum of about 100 millitorrs is created; cleaning of the glass is completed with a glass discharge for a period of about 10 minutes. Thereafter, the pressure is lowered to about $2 \times 10^{-5}$. Thereafter, the pressure is lowered to about $2 \times 10^{-5}$ torrs in order to perform the evaporation of the alloy.

The thickness of the anchoring layer and of each of the subsequent layers can be measured and established by various well known and conventional means. It is thus possible to evaporate a predetermined amount of the material to be deposited by means of the measurement of the frequency derivative of a piezoelectric quartz which is placed in the field of the evaporators or, instead, a photometer may be used to measure certain optical characteristics, such as the transmission or reflection of the glass during different coating phases, and to utilize this information as a guide for determining the thickness of the deposit. The latter method is preferred.

When the composition of the alloys in accord with this invention permits the wire drawing of the alloy material, the alloys can be used in the form of pieces of wire of a given length which are rolled on crucibles, the crucibles themselves being formed from tungsten wire in accord with a convenient and known industrial method of using such crucibles. This is particularly the case for alloys belonging to the preferred family containing from about 15.5–17.5% by weight of chromium, from about 16–18% by weight of molybdenum, from about 3.7–5.3% by weight of tungsten, below about 0.12% by weight of carbon, from about 0.2–0.4% by weight of vanadium, below about 2.5% by weight of cobalt, from about 4.5–7% by weight of iron and the balance of the alloy consisting essentially of nickel. The industrial alloy called Hastelloy C 276 has the foregoing properties.

The four examples given below as illustrative for practicing the present invention all employ substantially the same alloy belonging to the preferred alloy as described immediately above. These examples demonstrate that with a judicious choice of the thickness of the anchoring layer, as well as the careful control of the thickness of the other coating layers, it is possible to greatly vary the optical characteristics (transmission, reflection and color) of the resulting semi-reflective glass.

In these examples, reference is made to the accompanying drawings in which FIGS. 1 to 4 represent, for each of examples 1 to 4, percent of transmission (T), percentage reflection (R) on the coated side containing the layers according to this invention, and percentage of reflection (R′) of the uncoated glass side, all as a function of the wavelength which is expressed in microns ($\mu$m).

EXAMPLE 1

An anchoring layer is deposited upon a 3 mm thick glass sheet by means of the vacuum evaporation of an alloy which is sold under the trade-name Hastelloy C 276. The alloy has the following nominal composition (% by weight): Ni: 55.05%; Co: 2.5%; Cr: 16%; Mo: 16%; W: b 4%; Fe: 5%; Si: 0.08%; Mn: 1%; C: 0.02%; V: 0.035%.

Deposition of this anchoring layer is continued until the light transmission, for a wavelength of 0.55 microns, represents 70% of the initial transmission. The wavelength of 0.55 microns has been selected because it corresponds approximately to the wavelength of maximum sensitivity of the human eye.

There is thereafter deposited, also by means of vacuum evaporation, a layer of gold to a thickness such that the transmission of light for the wavelength of 0.55 microns is between 28 and 29% of the initial transmission.

Finally, a zinc sulfide dielectric layer is deposited. As anticipated, during the course of this deposition and because of the interference effect, the light transmission first increases going through a maximum and then finally decreases. Evaporation of the zinc oxide is discontinued when the transmission represents 40% of the initial transmission. There is thus obtained a glass with a rather neutral appearance when viewed from the glass side. This glass exhibits excellent reflective and transmissive properties for the sun protection.

FIG. 1 represents the spectra of transmission (T), reflection on the coated side (R), and reflection on the uncoated glass side (R') for the semi-reflective glass produced by this example. If one considers, on the one hand, the energy distribution of the radiation spectrum and, on the other hand, the sensitivity curve of the human eye, it is possible to calculate by known means from the curve of the transmission (T) the two values or factors which characterize the semi-reflective glass; these are the factor of total energy transmitted (FET in %) and the factor of luminous transmission (Y in %) for the illuminant C.

In the case of the semi-reflective glass produced by this example, and from the curves of FIG. 1, it is found that the FET=24% while Y=36% which proves that the metallized glass has excellent sun protective properties.

EXAMPLE 2

An alloy having the composition of example 1 is deposited by means of vacuum evaporation on a glass sheet of a thickness of 3 mm. Depositing is halted when light transmission through the glass, for light at a wavelength of 0.55 microns, represents 80% of the initial transmission.

A gold layer is thereafter deposited until the transmission, also at a wavelength of 0.55 microns, is equal to 47% of the initial transmission.

Finally, a zinc sulfide layer constituting the dielectric layer is deposited. As in example 1, and because of the interference effect, the transmission first begins to increase going through a maximum and then decreases. Deposition is halted when the transmission represents 63% of the initial transmission.

Figure 2:
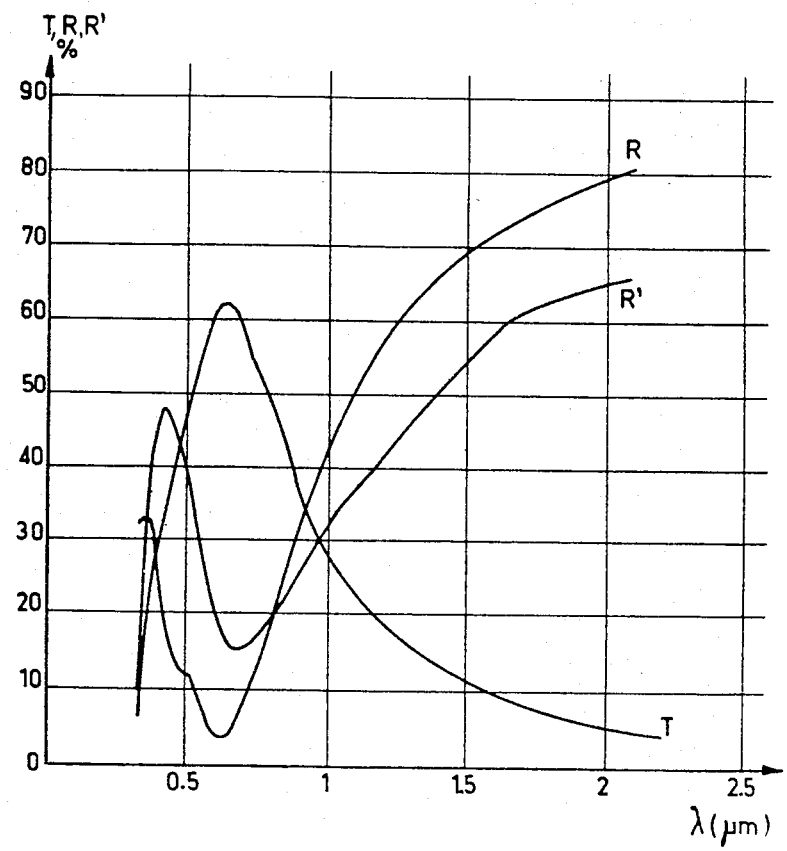

There is obtained a semi-reflective glass possessing a blue tint when viewed from the glass side. FIG. 2 represents the spectra of transmission (T), reflection (R) on the side coated according to the invention, and reflection (R') on the glass side. The semi-reflective glass exhibits good reflective and transmissive characteristics since its factor of total energy transmitted and its factor of luminous transmission are the following: FET=42%; Y=57%.

EXAMPLE 3

An alloy having the composition of example 1 is deposited, also by means of vacuum evaporation, on a glass sheet of 3 mm thick until its transmission for a wavelength of 0.55 microns represents 80% of the initial transmission.

A gold layer is thereafter deposited until the light transmission is 47% of the initial transmission.

Finally, a zinc sulfide layer constituting the dielectric layer is evaporated, which causes an initial increase of the transmission. Deposition of the zinc sulfide is halted when the transmission reaches 50% of the initial transmission.

A glass with a copper tint is obtained and which has excellent reflective and transmissive characteristics.

Figure 3:
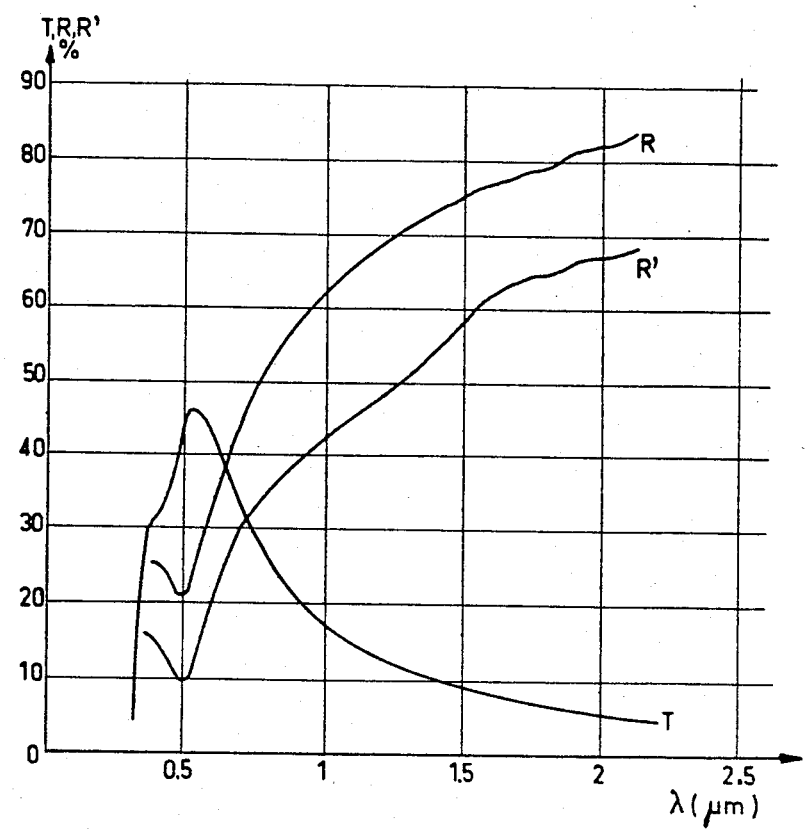

FIG. 3 represents the transmission spectrum (T) and the spectra of reflection (R) and (R') of this glass, respectively on the layered side coated according to the invention and on the glass support side. The factor of total energy transmitted (FET) is equal to 29% and the factor of luminous transmission (Y) to 44%.

EXAMPLE 4

An alloy having the composition of example 1 is deposited by vacuum evaporation on a glass sheet of a thickness of 3 mm. Evaporation is halted when the transmission for a wavelength of 0.55 microns represents 95% of the initial transmission.

A gold layer is thereafter deposited until the transmission drops to 75% of its initial value.

Finally, a zinc sulfide layer constituting the dielectric layer is evaporated until it reaches a maximum in the indications of the photometer.

Figure 4:
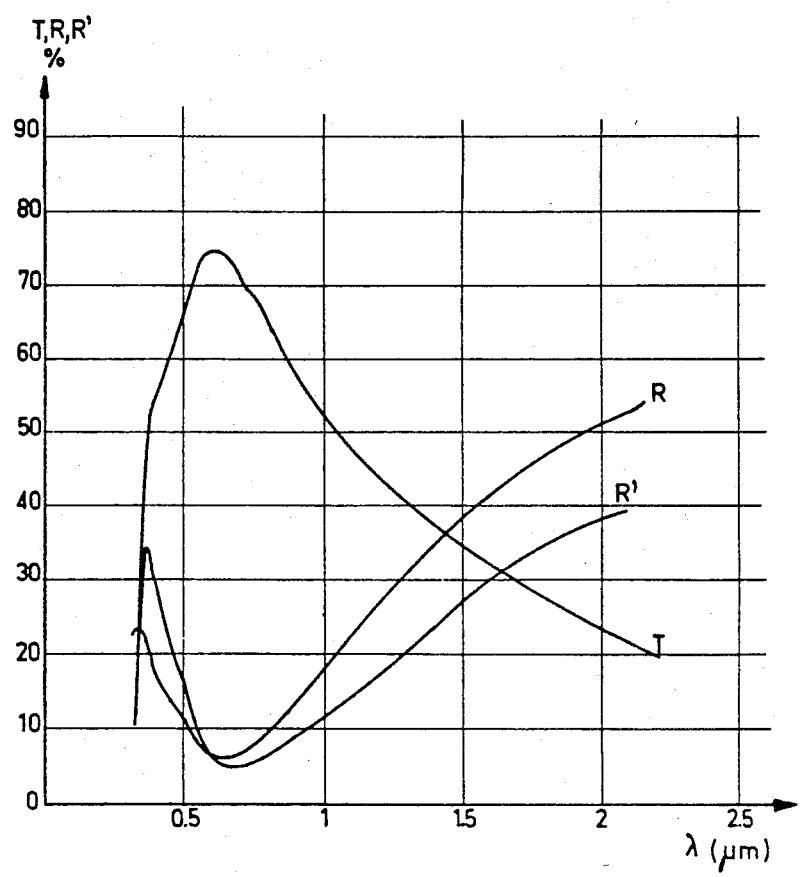

The transmission spectrum (T) and reflection spectra (R) and (R') are represented in FIG. 4.

The factors of total energy transmitted (FET) and luminous transmission (Y) of this glass are, respectively, equal to 60% and 72%.

Thus a glass that combines a good transparency in the visible light region of the solar spectrum and a good reflection of infrared radiation is obtained.

All of the above Examples were carried out with a negligible corrosion of the evaporation crucibles. The above Examples thus demonstrate that an alloy according to this invention exhibits the advantage of yielding an excellent anchoring layer, not only in terms of very diverse coatings of semi-reflective glasses that can be produced, but also in terms of the efficiency and lower cost of the process brought about by the non-corrosion of the crucibles. Further, the superb adherence obtained with such an anchoring layer makes it possible to use these coatings in laminated composite glasses.

I claim:

1. In the process for making semi-reflective metallized glasses, the improvement which comprises vacuum depositing an anchoring layer of a nickel base alloy containing at least 3% molybdenum and at least 5 percent chromium by thermal evaporation from an evaporation crucible upon at least one face of a glass substrate, said alloy providing increased deposition rates, improved properties of the deposit, and the elimination or substantial reduction of corrosion and/or the breakage of said crucible.

2. The process according to claim 1 wherein said alloy comprises about 40–70% by weight nickel, about 5–31% by weight chromium, and about 3–28% by weight molybdenum.

3. The process of claim 1 wherein the vacuum evaporation is performed from a tungsten crucible.

4. The process according to claim 1 wherein said alloy further comprises at least one metal selected from the group consisting of tungsten, iron and cobalt.

5. The process of claim 4 wherein the amount of the iron is less than about one third by weight based upon the total amount of the nickel, iron and cobalt present in said alloy.

6. The process of claim 4 further comprising interposing between a sheet of glass and said semi-reflective glazing a lamina layer bonded by said alloy.

7. The process of claim 6 wherein the lamina layer is a polyvinylbutyral layer.

8. The process according to claim 1 wherein said alloy comprises about 55–75% by weight of nickel, iron and cobalt, about 5–31% by weight chromium, and about 3–28% by weight of molybdenum and tungsten.

9. The process of claim 8 wherein the alloy comprises from about 40–63% by weight nickel, from about 2–20% by weight iron and wherein the total of nickel, iron and cobalt is from about 58–68% by weight, from about 15–25% by weight chromium, and from about 5–18% by weight molybdenum, from about 0–6% by weight tungsten and wherein the total of molybdenum and tungsten is from about 5–22% by weight.

10. The process of claim 9 wherein the alloy comprises from about 15.5–17.5% by weight chromium, from about 16–18% by weight molybdenum, from about 3.7–5.3% by weight tungsten, below about 0.12% by weight carbon, from about 0.2–0.4% by weight vanadium, below about 2.5% by weight cobalt, from about 4.5–7% by weight iron and the balance of said alloy consisting essentially of nickel.

11. In the process for making semi-reflective metallized glasses, the improvement which comprises vacuum depositing from a tungsten evaporation crucible an anchoring layer of a nickel-chromium-molybdenum alloy upon at least one face of a glass substrate, said alloy comprising about 40–70% by weight nickel, about 5–31% by weight chromium, and about 3–28% by weight molybdenum, followed by depositing at least one semi-reflective layer upon said anchoring layer.

12. The process of claim 11 wherein the semi-reflective layer is comprised of gold, silver or copper.

13. The process of claim 11 wherein a dielectric layer is deposited upon the semi-reflective layer.

14. The process of claim 13 wherein the dielectric layer is silicon oxide, zinc sulfide or mixed indium and tin oxide.

15. The process of claim 11 further comprising the deposition of a nickel-chromium-molybdenum alloy layer upon said semi-reflective layer and the deposition of a dielectric layer upon said alloy layer.

16. The process of claim 15 wherein said alloy layer is substantially the same as said anchoring layer, said semi-reflective layer is gold, silver or copper, and said dielectric layer is silicon oxide, zinc sulfide or mixed indium and tin oxide.

17. The process of claim 11 further comprising interposing between a sheet of glass and said semi-reflective glazing a lamina layer bonded by said alloy.

18. The process of claim 17 wherein said lamina layer is polyvinylbutyral.

19. In the process for making semi-reflective metallized glasses, the improvement which comprises vacuum depositing from a tungsten evaporation crucible an anchoring layer of a nickel-chromium-molybdenum alloy upon at least one face of a glass substrate, said alloy comprising about 55–75% by weight of nickel, iron and cobalt, about 5–31% by weight chromium, and about 3–28% by weight molybdenum and tungsten, followed by depositing at least one semi-reflective layer upon said anchoring layer.

20. The process of claim 19 wherein the semi-reflective layer is comprised of gold, silver or copper.

21. The process of claim 19 wherein a dielectric layer is deposited upon the semi-reflective layer.

22. The process of claim 21 wherein the dielectric layer is silicon oxide, zinc sulfide or mixed indium and tin oxide.

23. The process of claim 19 further comprising the vacuum depositing of a nickel-chromium-molybdenum alloy layer upon said semi-reflective layer and the deposition of a dielectric layer upon said alloy layer.

24. The process of claim 23 wherein said alloy layer is substantially the same as said anchoring layer, said semi-reflective layer is gold, silver or copper, and said dielectric layer is silicon oxide, zinc sulfide or mixed indium and tin oxide.

25. The process of claim 19 further comprising interposing between a sheet of glass and said semi-reflective glazing, a lamina layer bonded by said alloy.

26. The process of claim 25 wherein said lamina layer is polyvinylbutyral.

* * * * *